(No Model.)

W. THOMAE.
FLY TRAP.

No. 519,745.        Patented May 15, 1894.

Witnesses:
E. Altenpohl.
Ferd. Maassen.

Inventor
William Thomae.
By his Attorney: Alfred E. Wiener

THE NATIONAL LITHOGRAPHING COMPANY,
WASHINGTON, D. C.

UNITED STATES PATENT OFFICE.

WILLIAM THOMAE, OF SCHENECTADY, NEW YORK.

FLY-TRAP.

SPECIFICATION forming part of Letters Patent No. 519,745, dated May 15, 1894.

Application filed December 7, 1893. Serial No. 493,014. (No model.)

*To all whom it may concern:*

Be it known that I, WILLIAM THOMAE, a citizen of the United States, residing at Schenectady, in the county of Schenectady and State of New York, have invented a useful Improvement in Fly-Traps, of which the following is a specification.

The object of my inprovement is to make fly traps of such a shape that, first, no additional bottom-piece, or bait-board, is required; second, that the opening, or entrance, is large enough to give the flies an easy access to the trap; third, that ample room is provided for a fluid having the purpose of receiving, and, eventually, killing the flies; fourth, that the inside walls of the trap are so inclined as to force the flies to drop into the said fluid, contained in the trap for the purpose mentioned; and fifth, that the said fluid, after being filled with flies, can conveniently be removed, and replaced. These various objects are attained in the following manner, reference being had to the annexed drawings, in which—

Figure 1:
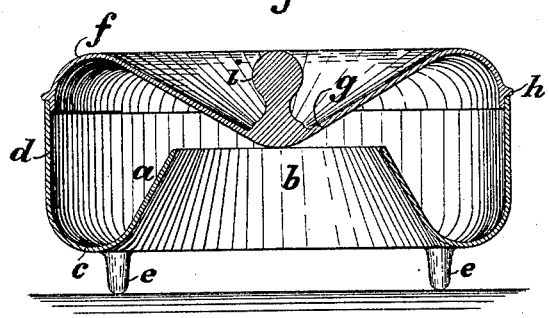
Figure 2:
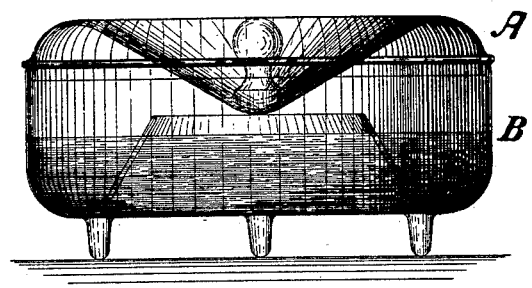

Figure 1 is a vertical central section, showing the shape of the walls of my improved fly-trap, and Fig. 2 is a side view, illustrating the appearance of my trap with the fluid contained in the same.

My fly-trap consists of a bottom-part, B, and a top-part, or cover, A, Fig. 2. The bottom-part, B, is of circular dish-form of a comparatively large diameter, and in its center is provided with inverted funnel-shaped walls, $a$, Fig. 1, projecting upward into the trap, and forming a large center-opening, $b$, for the access of the flies. The annular chamber formed by the inner walls, $a$, the bottom-wall, $c$, and the outer walls, $d$, serves to contain the fluid above referred to. The bottom-wall, $c$, is provided with projections, $e$, in order to raise the bottom of the trap sufficiently to allow the flies to pass to the bait, which is placed directly under the center-opening, $b$. The cover, A, is of concavo-convex shape, the outer portion, $f$, of the same, which is opposite to the bottom-chamber, being concave, and the center portion, $g$, being convex, thus bringing the center of the cover in proximity to the opening, $b$, of the bottom part. Thereby the flies, after entering through the opening, $b$, are kept in the annular space over the fluid, until, finally, they drop into the latter, and are drowned. A rim, $h$, serves to carry the cover, A, upon the bottom, B; and a handle, or knob, $i$, is to facilitate the handling of the cover in removing the contents of, and in refilling, the trap.

As to the material from which my improved fly-trap is to be made, the bottom-part may be of glass, or of any other suitable material, while the top-part, which is to be transparent as the flies are not likely to enter a dark trap, must be made of glass, or of wire netting, or other transparent material.

The fluid referred to in the above, may be clear water, but lye, soap-suds, old beer, &c., are preferable.

Keeping the general shape as heretofore described, the two parts may also be united into one. In this case, for convenience, an opening may be provided on the top, or on the side of the trap, otherwise the contents may be disposed of by inverting the trap, and flooding it from the opening $b$.

Although, in the above description, reference is had to a circular form of this improved fly-trap, the walls of the same may also form a square, or a rectangle, or any other geometrical figure.

Having thus described my invention, what I claim, and desire to secure by Letters Patent, is—

1. In fly traps, the combination of a dish-shaped bottom-part, B, having a conical central opening, with a concavo-convex, or funnel-shaped cover, A, which acts as a deflector and forces the flies into the liquid below, while the absence of an opening in the funnel-portion of the cover, and the presence of the projecting portion at the base of its handle, serve to prevent their escape, substantially as heretofore described.

2. A fly trap consisting of a single vessel, having a dish-shaped bottom with a conical central opening, and a concavo-convex, or funnel-shaped top, which, at that point where the tube of the funnel would join, projects over the center opening of the bottom, substantially as and for the purpose specified.

WILLIAM THOMAE.

Witnesses:
ALFRED E. WIENER,
HERBERT E. HUNT.